United States Patent

[11] 3,623,037

[72] Inventor Howard L. Parks
Woodland Hills, Calif.
[21] Appl. No. 864,616
[22] Filed Oct. 8, 1969
[45] Patented Nov. 23, 1971
[73] Assignee The Bunker-Ramo Corporation
Oak Brook, Ill.

[54] BATCH FABRICATED MAGNETIC MEMORY

17 Claims, 11 Drawing Figs.

[52] U.S. Cl. .................................................... 340/174 PW, 340/174 TF, 340/174 M, 340/174 S, 340/174 VA, 29/604
[51] Int. Cl. .................................................... G11c 5/04, G11c 11/04, G11c 11/14
[50] Field of Search .......................................... 340/174 PW, 174 TF, 174 S, 174 VA; 29/604

[56] References Cited

OTHER REFERENCES

IBM Technical Disclosure Bulletin, Vol. 12, No. 3, Aug. 1969, pg. 393
IBM Technical Disclosure Bulletin, Vol. 5, No. 7, Dec. 1962, pg. 65

*Primary Examiner*—James W. Moffitt
*Attorney*—Frederick M. Arbuckle

ABSTRACT: A magnetic wire memory construction comprising a plurality of stacked memory planes, each memory plane being formed from two like-formed self-supporting and rigid metal sheets in opposed relation. The sheets have channels formed therein using precision batch fabricated metal sculpturing techniques, with certain of the channels being filled with insulative material. The dimensions and locations of the channels are chosen so that precisely located memory wire receiving tunnels and corresponding insulated drive line strips perpendicular thereto are formed when the sheets are placed together in opposed relation. Memory wire elements are inserted into the tunnels which protect and shield the elements and maintain them accurately positioned with respect to one another and to the drive line strips so as to permit achieving a memory of increased density and speed of operation.

INVENTOR
HOWARD L. PARKS

BY Nathan Cass
ATTORNEY

INVENTOR
HOWARD L. PARKS
BY Nathan Cass
ATTORNEY

INVENTOR
HOWARD L. PARKS

BY Nathan Cass

ATTORNEY

BATCH FABRICATED MAGNETIC MEMORY

BACKGROUND OF THE INVENTION

The present invention relates generally to a magnetic memory and to a method of construction thereof. More particularly, the invention relates to a magnetic memory of the type employing wirelike memory elements.

It is well recognized that the construction of a magnetic wire memory presents significant problems which can result in increased fabrication costs and/or degraded memory performance. Such problems involve, for example, memory wire insertion, drive and sense line interconnection requirements, cross-talk, excessive heating, lack of uniformity, noise cancellation, etc.

SUMMARY OF THE PRESENT INVENTION

The present invention is directed to a magnetic wire memory construction and fabrication method therefor which makes possible the provision of an improved magnetic wire memory which significantly reduces the problems heretofore associated with such memories.

Briefly, a basic feature of the present invention resides in the use of precision batch fabricated metal sculpturing techniques on metal sheets for forming memory planes having tunnels and insulated conductive drive line strips at predetermined locations whereby, after stacking of the planes, a modular magnetic wire memory structure is obtained in which the magnetic wire elements are uniformly and symmetrically retained with respect to each other and to the memory drive lines with an accuracy and shielding significantly greater than would be possible using other known types of memory constructions. As a result, noise cancellation can be achieved to a much higher degree than was heretofore possible so as to permit achieving a significantly greater packing density as well as an increased speed of operation. Also, the use of sculptured metal sheets provides the memory with a much greater heat dissipation capability than would otherwise be possible.

The specific nature of the invention as well as other features, objects, advantages and uses thereof will become apparent from the following description of an exemplary embodiment and method in accordance with the invention taken in conjunction with the accompanying drawings in which.

It is to be understood that like numerals designate like elements throughout the figures of the drawing. It is also to be understood that various thicknesses and sizes shown in the drawings are exaggerated for the sake of clarity.

Figures 1, 2, 3, 4, 5, 5A, 6:
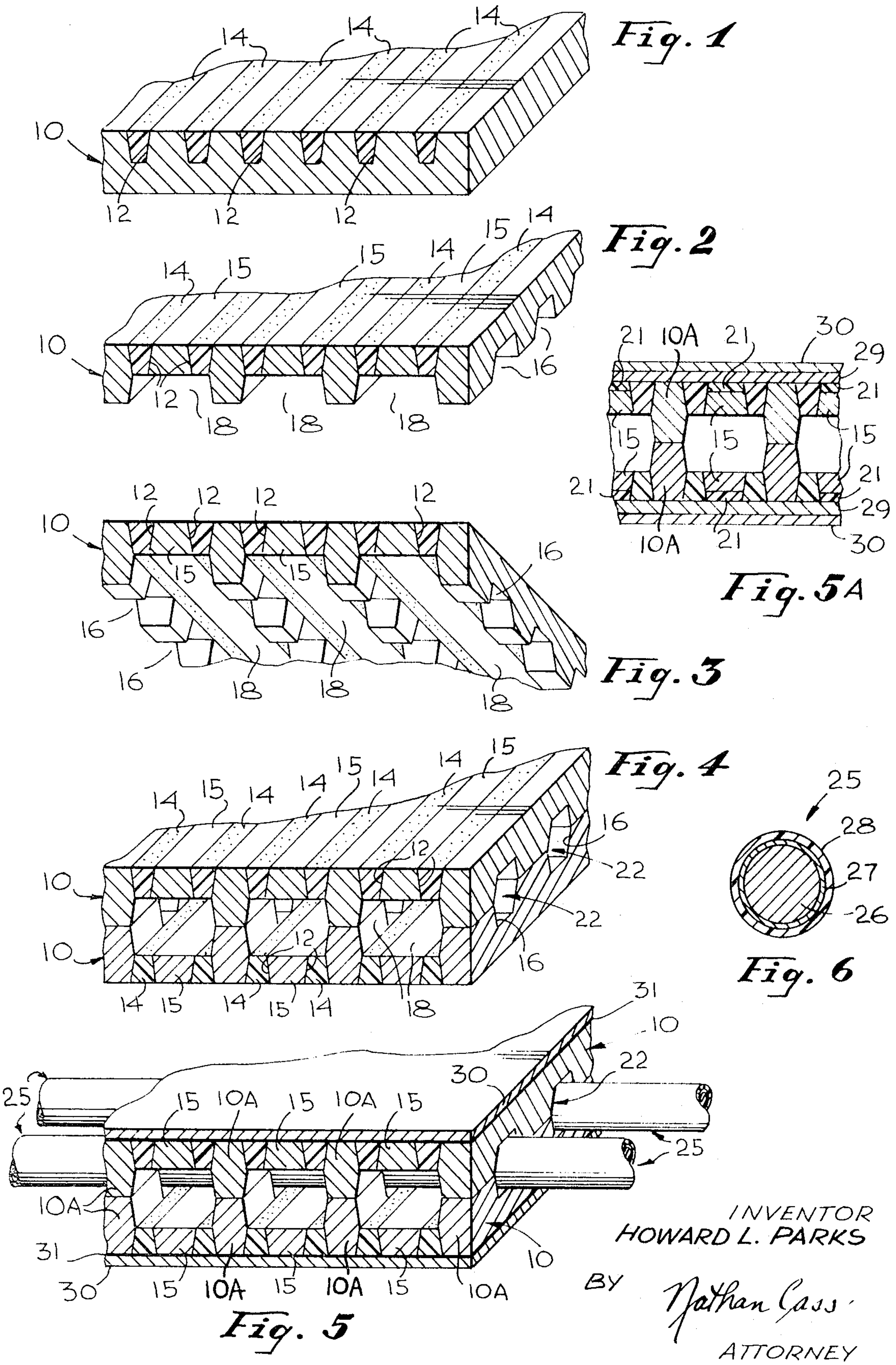
FIGS. 1–4 are fragmentary cross-sectional and pictorial views illustrating stages in the fabrication of a memory plane in accordance with the invention.
FIG. 5 is a fragmentary cross-sectional and pictorial view of a memory plane in accordance with the invention.
FIG. 5A is a fragmentary cross-sectional view of a modified form of the structure of FIG. 5.
FIG. 6 is a cross-sectional view illustrating the structure of an exemplary plated wire memory element which may be employed in the memory of the invention.

Referring initially to FIG. 1, a rigid self-supporting conductive metal plate or sheet 10 which may, for example, be beryllium copper has a first plurality of spaced parallel channels 12 chemically etched in one surface thereof. The channels 12 are filled with dielectric material 14 which is ground flush with the surface.

As will be understood from FIGS. 2 and 3, the other surface of the sheet 10 is chemically etched to form second and third pluralities of spaced parallel channels 16 and 18 respectively perpendicular and parallel to the channels 12. The channels 18 are also located opposite respective channels 12 and have a width and depth with respect thereto so as to form spaced conductive strips 15 insulated from one another and from the sheet 10, and supported by the dielectric material 14. It is to be understood that well known precision chemical etching techniques, such as photolithograph, may be employed for etching the channels 12, 16, and 18.

Two identical sheets 10 etched as shown in FIGS. 2 and 3 are then accurately fused together in opposed relation to provide the resulting memory plane structure illustrated in FIG. 4. It will be noted that the opposed channels 16 combine to form tunnels 22 into which memory wire elements 25 are inserted as illustrated in FIG. 5. These tunnels 22 serve to hold and protect the memory wire elements 25 and to keep them accurately positioned with respect to the conductive strips 15. It is to be understood that suitable tunnels could also be provided with channels 16 provided in only one of the sheets 10.

Still referring to FIG. 5, it will be seen that the conductive strips 15 perpendicularly cross the wire elements 25 on opposite sides thereof so as to permit their use as drive lines. It will also be seen that each memory element 25 is completely surrounded by contacting metal portions of the sheets 10, and that the drive line strips 15 alternate with contacting metal portions 10A of the sheets 10, thereby providing good shielding for each memory element 25 as well as for each opposed pair of drive lines 15. If even greater shielding is desired, a construction as illustrated in FIG. 5A could be provided in which the drive line strips 15 are recessed from the outer surfaces and the recesses 21 filled with dielectric material ground flush with the outer surfaces. An adjacent contacting conductive layer 29 is then provided over the surface such as by plating or by the provision of a metal sheet fused thereto to complete the conductive encirclement of each pair of opposed drive lines 15.

As illustrated in FIGS. 5 and 6, a high permeability magnetic layer 30 of, for example, conetic or permalloy may also be provided on one or both of the outer sides of each plane in order to reduce memory cell disturbance by the earth's magnetic field. An insulation layer 31 is additionally provided in the embodiment of FIG. 5 to prevent the magnetic layer 30 from shorting the insulated strips 15.

FIG. 6 illustrates an exemplary type of memory element which may be employed for each of the memory elements 25 in FIG. 5. Typically, the memory element 25 illustrated in FIG. 6 comprises a beryllium copper inner wire 26 having, for example, a diameter of 0.005 inch and on which is plated an essentially single domain thin film 27 of magnetic material such as permalloy having a thickness of, for example, 10,000 A. The plating is done in a circumferential magnetic field produced by current flowing in the inner wire 26 so that the resulting film 27 is magnetically anisotropic, displaying remanent magnetism in the circumferential direction (commonly referred to as the "easy" direction), but not in the longitudinal direction (commonly referred to as the "hard" direction). A final insulative coating 28 of, for example, 0.0001 inch of a thermoplastic material is applied over the magnetic film 27, such as by dipping, so as to prevent shorting of the drive line conductive strips 15 when the memory wire elements 25 are inserted in the tunnels 22 as shown in FIG. 5.

Figure 7:
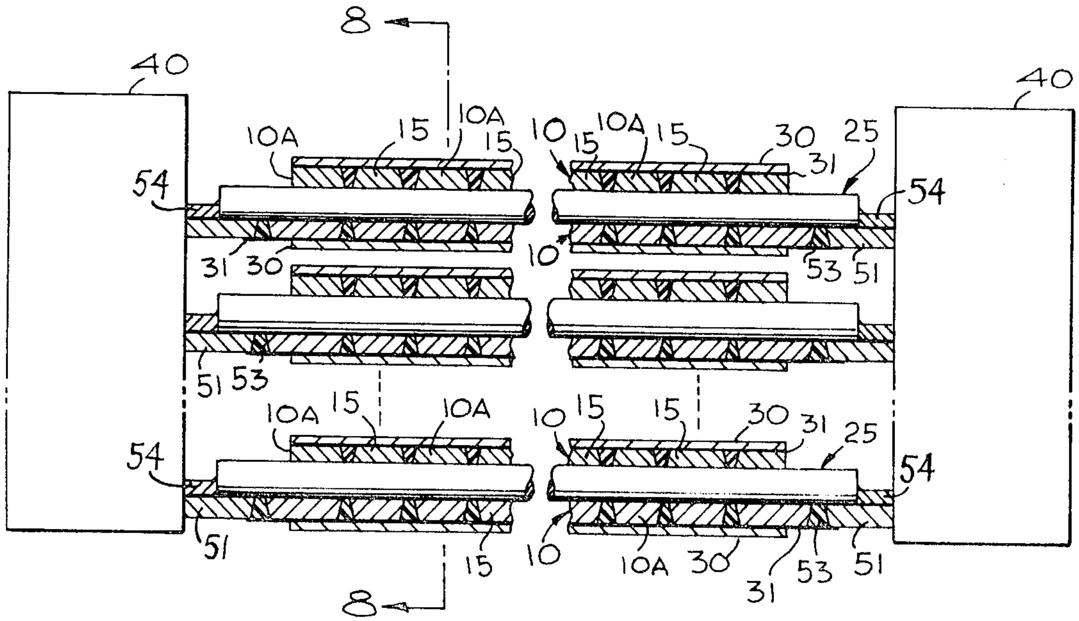
FIGS. 7 and 8 are cross-sectional partially schematic views illustrating how a plurality of the memory planes of FIG. 5 may be stacked and peripherally interconnected to form a multiplane three-dimensional memory.
Figure 8:
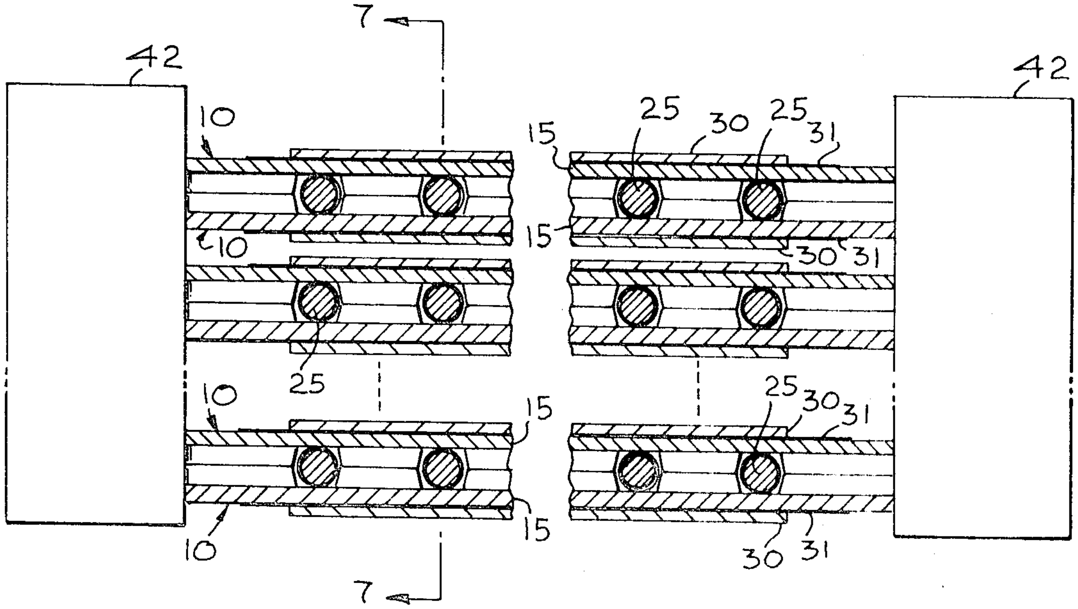
Figure 9:
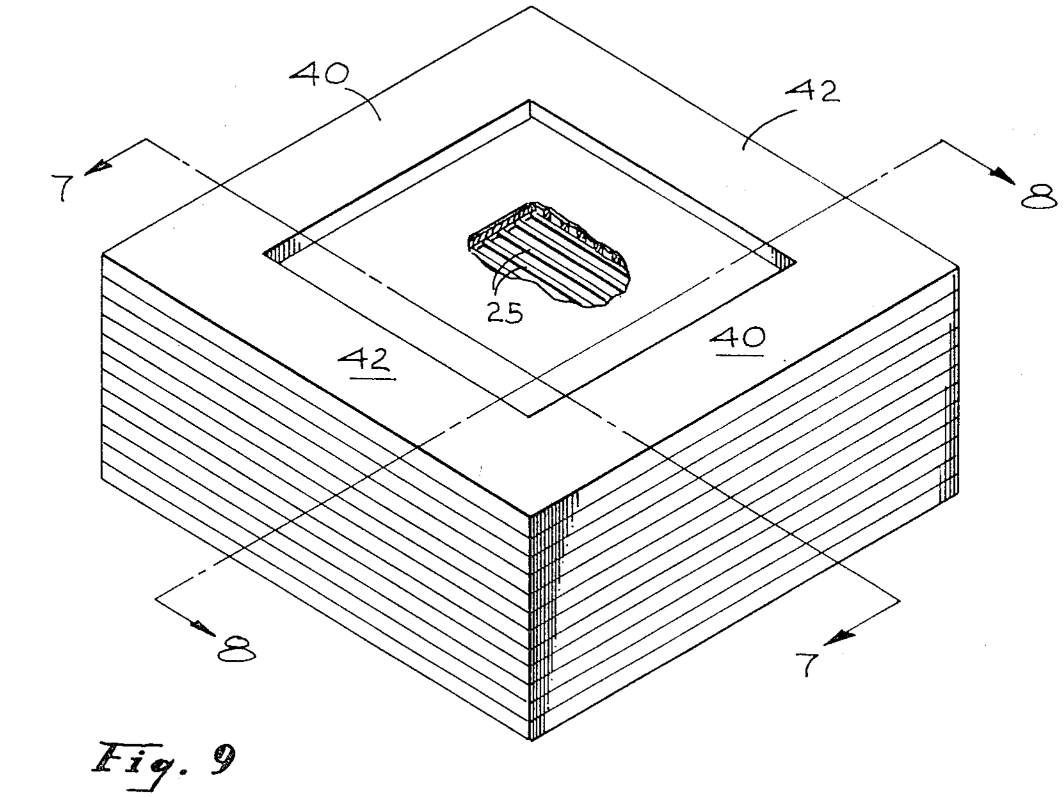
FIG. 9 is an overall pictorial view illustrating an exemplary arrangement of the memory of FIGS. 7 and 8.

FIGS. 7–9 illustrate how a plurality of the memory planes of FIG. 5 may be stacked and peripherally interconnected to form a multiplane three-dimensional memory. FIG. 7 is a cross section taken longitudinally through the center of a wire memory element 25 and perpendicular to the drive line strips 15, while FIG. 8 is a cross section taken longitudinally through the center of a drive line strip 15 and perpendicular to the wire memory elements 25, as indicated by the line 8—8 in FIG. 7, the line 7—7 in FIG. 8, and the lines 7—7 and 8—8 in FIG. 9.

The peripheral sections 40 and 42 in FIGS. 7—9 contain circuitry which provides appropriate interconnections for the inner conductors 26 of the memory wire elements 25 and the drive line strips 15. These peripheral sections 40 and 42 may also advantageously contain the sensing, selecting and driving circuitry required for the memory. The circuitry in the sections 40 and 42 is preferably provided using the coaxial packaging techniques disclosed in the commonly assigned U.S. Pat. No. 3,351,816 and in the commonly assigned copending Pat. applications Ser. No. 613,652, filed Feb. 2, 1967 and now abandoned in favor of the copending continuation-in-part Pat. application, Ser. No. 49,873, filed June 25, 1970, and Ser. No. 819,888, filed Apr. 28, 1969 and now abandoned in favor of the copending continuation-in-part Pat. application, Ser. No. 7,746, filed Feb. 2, 1970. As illustrated in FIG. 9, the resulting memory will then comprise a stack of wafers containing memory wire elements and drive lines as well as the peripheral sensing, driving, selecting, and interconnecting circuitry therefor.

Figure 10:
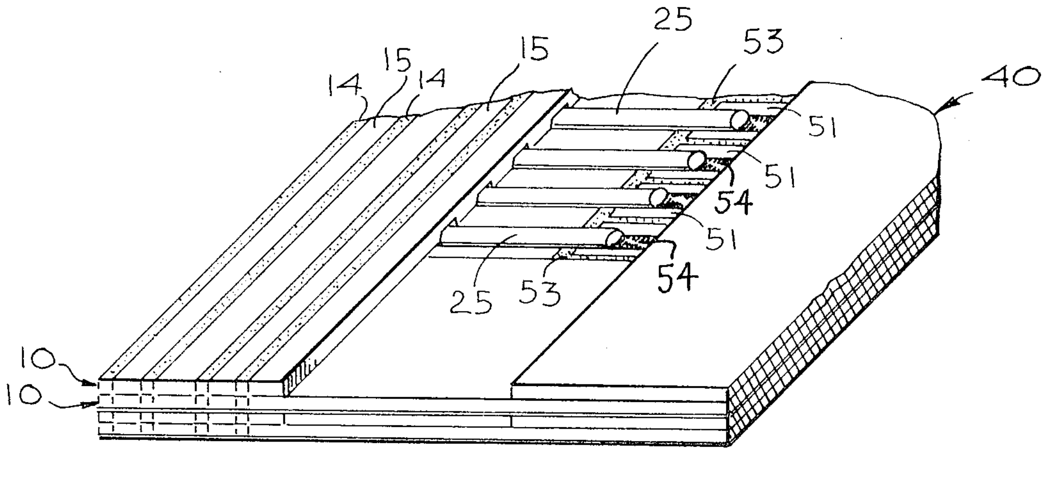
FIG. 10 is a fragmentary pictorial view illustrating how peripheral interconnections may typically be provided to the memory elements.

It will be seen in FIGS. 7 and 10 that the lower sheet 10 of each memory plane extends into the peripheral sections 40 in order to feed thereto the memory wire connecting strips 51 to which are soldered the ends of the inner conductors of the memory elements 25. The solder is indicated by the numeral 154. Insulative material 53 is provided to insulate the connecting strips 51 from each other and from the sheet 10. Also, as shown in FIG. 8, both of the sheets 10 extend into the peripheral sections 42 in order to feed the drive line strips 15 thereto. Thus, the memory sheets 10 may conveniently be incorporated with the circuitry of the peripheral wafers to provide the resulting structure shown in FIG. 9.

It will be understood that a memory constructed as described herein may be operated in various known types of operating modes in either a destructive or nondestructive manner. One skilled in the art will readily be able to provide the required driving, sensing, selecting, and interconnecting circuitry for this purpose. It will also be understood that in accordance with well known noise cancellation techniques, certain of the wires 25 may be provided without a magnetic film 27 (FIG. 6) thereon so that they may serve as "dummies" to provide for noise cancellation.

Although the invention has been described in connection with a particular exemplary embodiment, it is to be understood that the construction, arrangement, fabrication and/or use of the invention is subject to considerable variations and/or modifications without departing from the scope of the invention as defined in the appended claims.

The embodiments of the invention in which an exclusive property or privilege is claimed are defined as follows:

1. In a magnetic memory, a memory structure comprising:
a first plurality of spaced, electrically insulated, parallel conductors supported in a first common plane,
a second plurality of spaced, electrically insulated, parallel conductors supported in a second common plane perpendicularly spaced from said first common plane and located so that respective conductors in said planes are parallel and opposite,
a plurality of spaced conductive shielding members parallel to said conductors and disposed between adjacent opposing pairs thereof and insulated therefrom,
a plurality of spaced parallel wirelike memory elements supported between said common planes so as to be crossed by said conductors on opposite sides thereof, and
conductive material provided encircling each of said elements,
said structure comprising adjacent and opposed electrically connected self-supporting conductive planar members having channels therein and dielectric material in predetermined ones of said channels, the sizes and locations of said channels being such as to provide said conductors, said shielding members and said conductive material.

2. The invention in accordance with claim 1,
wherein conductive material is additionally provided electrically connecting said shielding members so as to provide conductive encirclement of each pair of opposed conductors.

3. The invention in accordance with claim 1,
wherein a plurality of memory structures each as defined therein are stacked to form a three-dimensional memory.

4. In a magnetic memory,
first and second adjacent conductive planar members each having spaced, electrically insulated, parallel conductors formed therein in a common plane perpendicularly spaced from its inner surface, at least one planar conductive member also having spaced parallel channels formed in its inner surface and extending in a direction so as to cross said conductors,
said first and second planar members being in opposed relation to one another with the conductors and channels of one planar member opposite and parallel to respective conductors and channels of the other planar member and so that the channels form tunnels crossed by conductors on opposite sides thereof, and
wirelike memory elements disposed in said tunnels.

5. The invention in accordance with claim 4,
wherein both planar conductive members have spaced parallel channels formed in their inner surface and extending in a direction so as to cross said conductors.

6. The invention in accordance with claim 4,
wherein conductive portions of each planar member are disposed between adjacent conductors and insulated therefrom, and
wherein respective opposed ones of said conductive portions of said planar members are electrically connected so as to provide shielding between adjacent pairs of opposed conductors.

7. The invention in accordance with claim 6,
wherein a plurality of said first and second planar members are stacked to form a three-dimensional memory.

8. The invention in accordance with claim 6,
wherein a magnetic layer is provided adjacent at least one of the outer surfaces of said planar members.

9. The invention in accordance with claim 6,
wherein the conductors and conductive portions of each planar member are insulated and supported by dielectric-filled channels provided therebetween.

10. The invention in accordance with claim 6,
wherein additional conductive material insulated from said conductors is provided electrically connecting said conductive portions so as to provide conductive encirclement of each pair of opposed conductors.

11. The invention in accordance with claim 10,
wherein said conductors are recessed with respect to their respective outer surfaces, and
wherein said additional conductive material is a conductive layer electrically connected to each outer surface.

12. The invention in accordance with claim 6,
wherein said parallel conductors and said conductive portions of each planar member are formed by the provision of spaced parallel dielectric-filled channels in the outer surface of each sheet in conjunction with the provision of spaced parallel isolating channels in the inner surface of each sheet parallel to said dielectric-filled channels and having a location, width, and depth relative thereto so as to electrically isolate each of said conductors from its planar member.

13. The invention in accordance with claim 12,
wherein each isolating channel is located opposite a respective conductor of its planar member and has a width extending at least beyond the nearest side of each of the dielectric-filled channels forming the conductor and has a depth extending to the conductor, whereby the conductor is electrically isolated.

14. The invention in accordance with claim 6,
wherein each wirelike memory element has an insulative outer coating.

15. The invention in accordance with claim 14,
wherein each wire like element has a conductive inner wire and a magnetic thin film provided thereon capable of storing data.

16. The invention in accordance with claim 15, wherein means are provided for making electrical contact with the conductive inner wire of each element.

17. The invention in accordance with claim 16, wherein said means comprises an insulated conductor formed in one of said planar members and electrically connected to said inner wire.

* * * * *